United States Patent [19]

Ferguson

[11] Patent Number: 4,580,666
[45] Date of Patent: Apr. 8, 1986

[54] DYNAMIC LINEAR VIBRATION DAMPER

[75] Inventor: Robert J. Ferguson, Marshall, Mich.

[73] Assignee: Simpson Industries, Inc., Litchfield, Mich.

[21] Appl. No.: 613,198

[22] Filed: May 23, 1984

[51] Int. Cl.⁴ ............................................. F16F 7/10
[52] U.S. Cl. .................................... 188/379; 29/451;
74/574; 248/559; 267/136; 403/224
[58] Field of Search ................ 188/379, 381, 322.5,
188/378, 380; 267/153, 63 R, 136, 141; 29/451,
450; 403/224, 225, 226, 220; 74/574; 248/559,
562, 635; 180/902

[56] References Cited

U.S. PATENT DOCUMENTS

| 2,068,035 | 1/1937 | Meyer | 29/451 X |
|---|---|---|---|
| 2,795,037 | 6/1957 | Haushalter | 29/450 |
| 2,882,747 | 4/1959 | Haushalter | 74/574 |
| 2,924,008 | 2/1960 | Haushalter | 29/451 |
| 3,031,034 | 4/1962 | Thomas | 183/381 |
| 3,058,321 | 10/1962 | Aske | 74/574 X |
| 3,077,244 | 2/1963 | Evjen | 188/381 |
| 3,085,658 | 4/1963 | Bedford, Jr. | 188/379 |
| 3,388,772 | 6/1968 | Marsh et al. | 188/379 |
| 3,670,593 | 6/1972 | Troyer | 74/574 |
| 3,826,339 | 7/1974 | Brokaw | 188/381 |
| 3,990,324 | 11/1976 | Fishbaugh et al. | 188/379 X |
| 4,133,157 | 1/1979 | Bschorr et al. | 52/403 |
| 4,361,214 | 11/1982 | Roberts | 188/335 |
| 4,378,865 | 4/1983 | McLean | 188/379 |
| 4,492,129 | 1/1985 | Hasegawa | 403/224 X |

Primary Examiner—Bruce H. Stoner, Jr.
Assistant Examiner—Robert J. Oberleitner
Attorney, Agent, or Firm—Beaman & Beaman

[57] ABSTRACT

A dynamic linear vibration damper consisting of a support member and an inertia member assembled by an elastomer for vibration damping purposes. An extension defined on the support member is received within an opening in the inertia member, and an elastomer interposed between the extension and the opening surfaces is installed under tension whereby the resiliency of the elastomer places the elastomer under compression as confined by the opening to frictionally maintain the assembly of the components.

5 Claims, 8 Drawing Figures

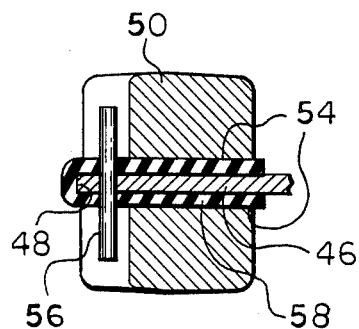
FIG 8
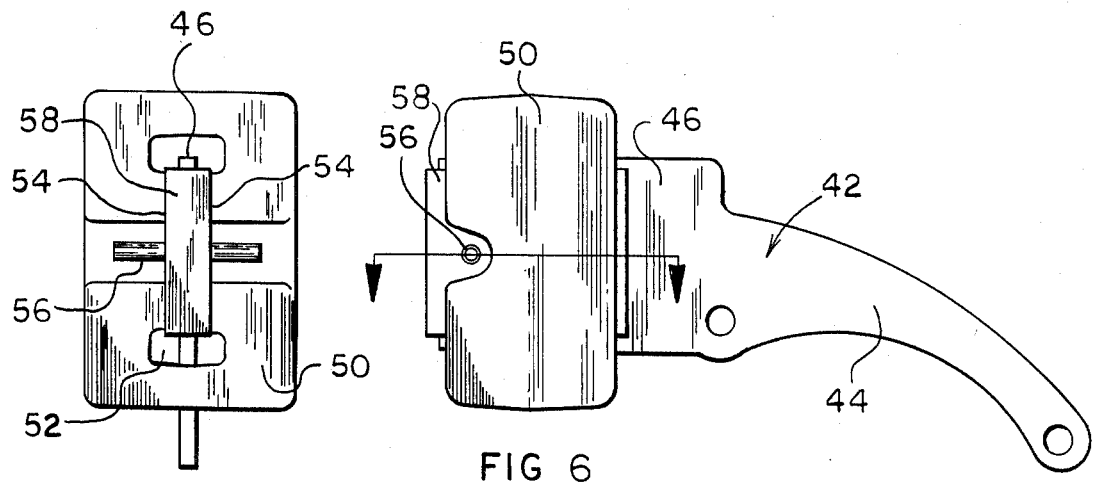
FIG 7
FIG 6

DYNAMIC LINEAR VIBRATION DAMPER

BACKGROUND OF THE INVENTION

Dynamic vibrations mechanically produced can be damped by interposing an elastomer between components. Typical vibration damping devices are shown in U.S. Pat. Nos. 3,031,034; 3,077,244; 3,085,658; 3,388,772; 3,826,339; 4,133,157 and 4,361,214. In these patents a diversity of arrangements are disclosed wherein an elastomer is bonded or interposed between support and inertia members to absorb and dissipate vibrations.

In the attachment of elastomers to damper components, it is common to bond the elastomer to the support and inertia members, which usually are of metal, by adhesives, heat treatments, vulcanizing, or the like. As the dynamic character of the damper imposes considerable stress on the damper components, difficulty has been encountered in successfully using conventional bonding and vulcanizing techniques, and the failure of conventionally constructed vibration dampers is common, and extended life cycles are difficult to achieve.

The assignee has utilized the elastomeric forces within an elastomer to maintain the assembly of rotary vibration dampers as used with internal combustion engine crankshafts wherein the elastomer is installed by a tensioning or stretching of the elastomer during assembly and the resultant frictional forces occurring due to the tendency for the elastomer to return to its normal state and dimensions frictionally maintains the assembled components. Examples of this type of device are shown in the assignee's U.S. Pat. Nos. 3,670,593 and 2,882,747. However, the assembly procedures shown in the aforementioned patents have not been previously utilized with dynamic linear dampers, and it is an object of the invention to provide a dynamic linear vibration damper of an economical construction which has an extended operational life and yet is economical to produce and assemble.

A further object of the invention is to provide a dynamic linear vibration damper utilizing a support member, an inertia member and an elastomer wherein the internal forces within the elastomer are utilized to maintain the assembly of the components, and bonding or vulcanizing techniques are not required.

Yet another object of the invention is to provide a dynamic linear vibration damper capable of damping a wide range of vibration frequencies, and wherein the damper is of such configuration and operation as to be suitable for a wide variety of applications.

In the practice of the invention, a support is mounted upon the members to be damped. The support is preferably formed of sheet metal and is of an economical construction, as are the other components of the damper. The support includes at least one planar extension having a free end receivable within an opening formed in an inertia or mass member.

The inertia member usually consists of a relatively heavy material, such as metal, and may be cast, stamped, or otherwise fabricated. The inertia member includes an opening receiving the support extension free end and parallel spaced sides defining the opening are in spaced relationship to the support extension wherein an elastomer is interposed between the extension and the opening sides so that the inertia member is mounted on the support by the elastomer.

The assembly of the support extension, inertia member and elastomer is achieved by internal forces within the elastomer producing high frictional engagement between the three components. To achieve this relationship the elastomer is inserted into the mass member opening while under tension such that the resiliency of the elastomer tending to restore the elastomeric material to its normal condition produces high frictional forces against the confining surfaces of the opening and upon the support extension. The assembly of the elastomer within the opening is readily achieved by forcing the elastomer into the mass member openings by the free end of the extension wherein the elastomer is automatically stretched and tensioned as it is inserted into the opening.

For safety purposes, an abutment, in the form of a pin, is mounted upon the extension free end to prevent withdrawal of the extension from the opening in the event of failure of the elastomer to maintain the assembly.

With the practice of the invention, an effective dynamic linear vibration damper is readily assembled from economically fabricated components capable of an effective and long operative life.

BRIEF DESCRIPTION OF THE DRAWINGS

The aforementioned objects and advantages of the invention will be appreciated from the following description and accompanying drawings wherein:

FIG. 6 is a side, elevational view of another embodiment of linear vibration damper in accord with the invention, FIG. 7 is an elevational view as taken from the left of FIG. 6, and FIG. 8 is a sectional view as taken along Section VIII—VIII of FIG. 6.

DESCRIPTION OF THE PREFERRED EMBODIMENTS

Figure 1:
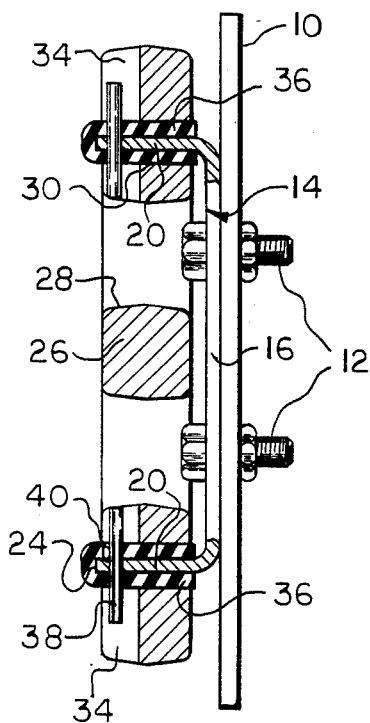
FIG. 1 is a side elevational view, partially sectioned, illustrating one embodiment of linear vibration damper in accord with the invention.
Figure 2:
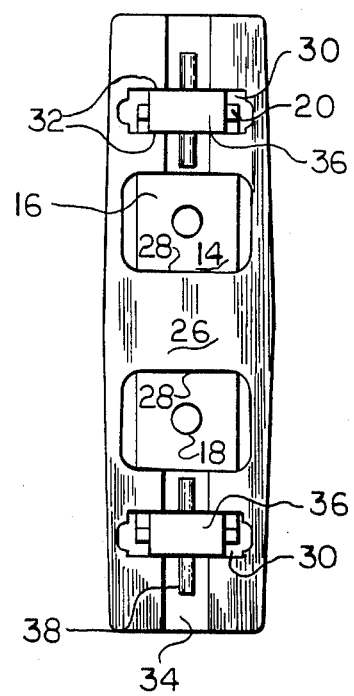
FIG. 2 is a front elevational view as taken from the left of FIG. 1, of the damper, per se.
Figure 4:
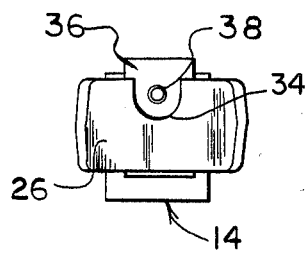
FIG. 4 is a top plan view of FIG. 3.
Figure 5:
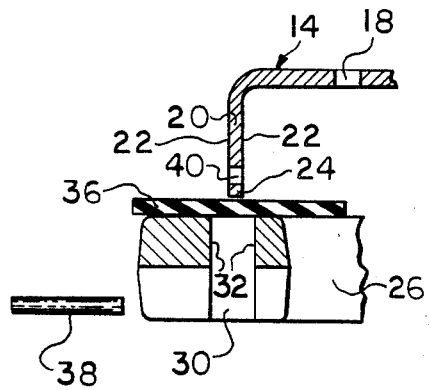
FIG. 5 is a detail, elevational, sectional view of the damper components immediately prior to assembly.
Figure 3:
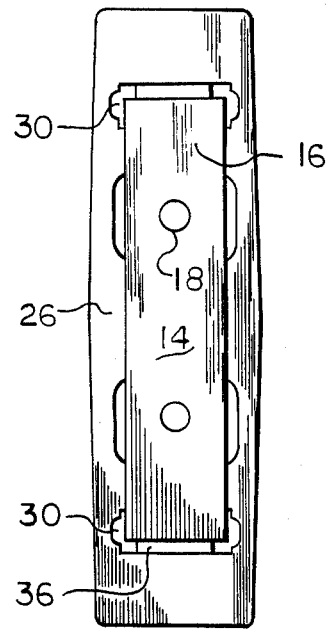
FIG. 3 is a rear elevational view of the damper, per se.

In the embodiment of FIGS. 1-5, the support member utilizes a pair of extensions for assembly to the inertia member, while in the embodiment of FIGS. 6-8 only a single support extension is used with a smaller mass. These two embodiments are illustrative of devices utilizing the inventive concepts, and depending upon the range of frequencies to be damped, these embodiments, or similar variations within the scope of one skilled in the art, practice the invention.

With reference to the embodiment of FIGS. 1-5, the member to be damped is represented at 10, and includes a flat surface to which the damper is attached by bolts 12 and nuts. The bolts attach the U-shaped support 14 to the member 10, and the support includes a base 16 having holes 18, FIG. 2, defined therein for receiving the bolts, and parallel legs 20 extend from the base in spaced relationship to each other. The legs 20 define extensions having parallel surfaces 22, and each has a free end 24. The support 14 may be economically formed of sheet metal by a stamping operation.

The damper includes an inertia or mass member 26 which may be of cast metal, plate, or other relatively heavy material. In the illustrated form, the member 26 is of a substantially rectangular configuration and includes openings 28 which, in the assembly, are in alignment with the holes 18 to provide access to the bolts 12.

A pair of openings 30 are also defined in the inertia member and include spaced parallel flat surfaces 32, and are so located as to centrally receive the support legs 20. As will be appreciated from FIG. 1, the length of the legs 20 is only slightly greater than the thickness of the member 26.

The inertia member 26 is provided with longitudinally extending recesses 34 intermediate an opening 28 and an end of the member, and the purpose for this recess is described below.

The inertia member 26 is mounted upon the support 14 by an elastomeric material 36 which is located upon each side of each leg and frictionally engages the surfaces 22 and the opening surfaces 32. As high frictional forces exist between the elastomer and the surfaces contacted, a firm assembly of the inertia member upon the support is achieved without requiring adhesives, bonding material, vulcanization, or other techniques often employed when using elastomers with metal parts.

In order to produce the desired frictional engagement between the elastomer 36 and the support and inertia member surfaces, the elastomer is under a stressed condition due to its confinement within the openings 30. This stress condition is due to the tendency for the elastomer to return to a "normal" state after being tensioned during assembly.

The tensioning of the elastomer is simultaneously accomplished with the insertion of the support legs 20 into the inertia member openings 30. As viewed in FIG. 5, the elastomer in sheet form is placed upon the member 26 over an opening 30 and the free end 24 of the leg engages the elastomer as the leg is inserted into the opening 30. By controlling the thickness of the leg, the spacing between the opening surfaces 32, the thickness of the elastomer sheet 36, and the elastomeric characteristics of the elastomer, a predetermined degree of stretching or tensioning of the elastomer will occur as the legs are inserted into the openings, and after this assembly movement has terminated, the tendency for the elastomer to return to a "normal" condition, which is prevented due to confinement with the openings 30, produces a compressive condition within the elastomer which results in the desired frictional forces to maintain the assembly of the components. As the elastomer is in a compressed state, the likelihood of deterioration of the elastomeric characteristics is reduced as compared to bonded, vulcanized and tensioned conditions, and superior efficiencies are experienced over an extended life cycle.

For safety purposes, an abutment pin 38, such as a roll pin, is inserted through a hole 40 defined adjacent the free end 24 of each of the legs, and this abutment pin is received within the inertia member recesses 34, but is in spaced relationship to the recess surfaces. Thus, the abutment pin does not engage the inertia member during normal operation of the damper, and is only effective to prevent the inertia member from disassembling from the support 14 in the event of failure of the elastomer to maintain the assembly.

In the embodiment of FIGS. 6–8, the support member 42 is of a single extension type and comprises a sheet metal element having a mounting portion 44 of any desired configuration for attachment to the member to be damped. The support 42 includes an extension or leg 46 of generally rectangular configuration having a free end 48.

The inertia member 50 is of a rectangular form and includes an opening 52 defined by spaced parallel surfaces 54. The opening 52 is symmetrically related to the member configuration. The member 50 includes a recess to provide clearance for the abutment pin 56 extending through the free end of the extension 46.

As with the previously described embodiment, an elastomer 58 is located between the support extension 46 and the inertia member opening 52, and the elastomer is tensioned during assembly in the manner described above with respect to FIG. 5. Thus, the internal forces within the elastomer 58 will maintain the assembly of the inertia member upon the support, and the damper will function in the same manner as the damper described above with respect to FIGS. 1–5.

Vibration dampers constructed in accord with the above description, will normally be mounted upon the member to be damped in such a manner that the support extensions are substantially parallel to the direction of the vibrations to be absorbed and damped. Thus, as the support member vibrates, the resistance to this vibration, due to the inertia of the mass member, will produce slight relative movement between the support and mass member as absorbed by the elastomeric material, and the undesirable vibrations effectively damped. The resultant heat generated during damping within the elastomer is dissipated through the mass member and support, and as frictional forces are solely maintaining the assembly of the components, heat generated within the elastomer does not adversely affect the assembly.

Vibration dampers in accord with the inventive concepts are concise in size and may be readily mounted as needed on motors, vehicles, appliances and other objects requiring vibration damping.

It is appreciated that modifications to the inventive concepts may be apparent to those skilled in the art without departing from the spirit and scope of the invention.

I claim:

1. A dynamic linear vibration damper for damping an object vibrating in a linear direction comprising, in combination, a support adapted to be attached to the object to be damped, a planar extension defined on said support having opposite substantially parallel surfaces and lying in a plane substantially parallel to the linear direction of the vibrations to be damped, an inertia member having an elongated opening defined therein receiving said support extension, said member opening having spaced surfaces in opposed spaced relation to said extension surfaces, and an elastomer under compression within said opening interposed between said support extension and said member opening whereby friction maintains the assembly of said inertia member upon said support extension.

2. In a linear vibration damper as in claim 1, said compression of said elastomer being produced by the elastic contraction of said elastomer.

3. In a linear vibration damper as in claim 1, said extension having a free end extending through said member opening, and an abutment mounted upon said free end preventing withdrawal of said extension from said member opening.

4. In a linear vibration damper as in claim 3, said abutment comprising a pin mounted in said extension free end.

5. In a linear vibration damper as in claim 1, said support comprising a U-shaped element having a base and leg portions, said inertia member having two spaced openings defined therein, said leg portions comprising said support extension and each extending into a member opening.

* * * * *